(12) United States Patent
Grumm

(10) Patent No.: US 10,307,949 B2
(45) Date of Patent: Jun. 4, 2019

(54) METHOD OF FORMING A FRAME OF A SEAT BACK FOR A VEHICLE

(71) Applicant: BASF SE, Ludwigshafen (DE)

(72) Inventor: Kipp O. Grumm, Grand Rapids, MI (US)

(73) Assignee: BASF SE, Ludwigshafen am Rhein (DE)

( * ) Notice: Subject to any disclaimer, the term of this patent is extended or adjusted under 35 U.S.C. 154(b) by 766 days.

(21) Appl. No.: 14/772,229

(22) PCT Filed: Mar. 4, 2014

(86) PCT No.: PCT/US2014/020317
§ 371 (c)(1),
(2) Date: Sep. 2, 2015

(87) PCT Pub. No.: WO2014/149685
PCT Pub. Date: Sep. 25, 2014

(65) Prior Publication Data
US 2016/0009009 A1    Jan. 14, 2016

Related U.S. Application Data

(66) Substitute for application No. 61/791,819, filed on Mar. 15, 2013.

(51) Int. Cl.
*B29C 45/14*  (2006.01)
*B29K 105/08* (2006.01)
*B29L 31/00*  (2006.01)

(52) U.S. Cl.
CPC .... *B29C 45/14786* (2013.01); *B29C 45/1418* (2013.01); *B29C 45/14065* (2013.01);
(Continued)

(58) Field of Classification Search
CPC ........ B29C 45/14786; B29C 45/14065; B29C 45/1418; B29C 2045/14942
(Continued)

(56) References Cited

U.S. PATENT DOCUMENTS

| 2004/0169315 A1 | 9/2004 | Kaminski et al. |
| 2008/0038569 A1 | 2/2008 | Evans et al. |
| 2011/0316320 A1 | 12/2011 | Kulkarni et al. |

FOREIGN PATENT DOCUMENTS

| DE | 2548751 A1 | 5/1977 |
| JP | S 58-018223 A | 2/1983 |

(Continued)

OTHER PUBLICATIONS

International Search Report for Application No. PCT/US2014/020317 dated Aug. 20, 2014, 4 pages.
(Continued)

*Primary Examiner* — Christina A Johnson
*Assistant Examiner* — Xue H Liu
(74) *Attorney, Agent, or Firm* — DLA Piper LLP (US)

(57) ABSTRACT

A method forms a frame of a seat back for a vehicle. The frame includes a first polymeric material and a reinforcing composite layer that includes a second polymeric material and a plurality of fibers impregnated in the second polymeric material. The method includes the steps of supporting the reinforcing composite layer on moveable members in a mold and extending the moveable members relative to the mold to an extended position in the mold. The method also includes the steps of introducing the first polymeric material in a molten state into the mold and into contact with the reinforcing composite layer and displacing the reinforcing composite layer away from the moveable members by introducing the first polymeric material in the molten state between the moveable members and the reinforcing composite layer (Continued)

while the moveable members are in the extended position. The method further includes the steps of causing the first polymeric material to solidify in the mold and retracting the moveable members from the first polymeric material.

17 Claims, 11 Drawing Sheets

(52) U.S. Cl.
CPC .................. *B29C 2045/14942* (2013.01); *B29K 2105/08* (2013.01); *B29L 2031/771* (2013.01)

(58) Field of Classification Search
USPC .......................................... 264/257
See application file for complete search history.

(56) References Cited

FOREIGN PATENT DOCUMENTS

| | | |
|---|---|---|
| JP | S 62-257820 A | 11/1987 |
| JP | H 02-150321 A | 6/1990 |
| JP | H 10-296786 A | 11/1998 |
| WO | WO 2008/019981 A1 | 2/2008 |
| WO | WO 2008/060215 A1 | 5/2008 |
| WO | WO 2011072739 A1 | 6/2011 |

OTHER PUBLICATIONS

English language abstract for JPS 58-018223 extracted from the PAJ database on Sep. 9, 2015, 1 page.

English language abstract for JPS 62-257820 extracted from espacenet.com database on Sep. 9, 2015, 2 pages.

English language abstract for JPH 02-150321 extracted from espacenet.com database on Sep. 9, 2015, 2 pages.

English language abstract and machine-assisted English translation for JPH 10-296786 extracted from espacenet.com database on Sep. 9, 2015, 12 pages.

English language abstract and machine-assisted English translation for WO 2011/072739 extracted from espacenet.com database on Sep. 9, 2015, 44 pages.

Office Action from corresponding European Patent Appln. No. 14 712 466.3; dated Nov. 27, 2017.

Notification of Reasons for Refusal from corresponding Japanese Patent Appln. No. 2016-500604, and its English translation; dated Jan. 9, 2018.

US 10,307,949 B2

METHOD OF FORMING A FRAME OF A SEAT BACK FOR A VEHICLE

CROSS-REFERENCE TO RELATED APPLICATION(S)

This application is the National Stage of International Patent Application No. PCT/US2014/020317, filed on Mar. 4, 2014, which claims priority to and all the advantages of U.S. Patent Application No. 61/791,819, filed on Mar. 15, 2013, the content of which is incorporated herein by reference.

FIELD OF THE INVENTION

The present invention relates to a method of forming a frame of a seat back for a vehicle. In particular, the present invention relates to a method of forming a frame of a seat back for a vehicle from a first polymeric material and a reinforcing composite layer that includes a second polymeric material and a plurality of fibers impregnated in the second polymeric material.

DESCRIPTION OF THE RELATED ART

Frames of seat backs for vehicles, e.g. automobiles, were traditionally formed of metal, such as steel. Steel was often the material of choice for seat back frames based not only on the strength and rigidity of steel but also based on ease of manufacturing, i.e., readily available manufacturing processes to work with steel.

In recent years, alternative materials have been explored for use in the formation of seat back frames. These alternative materials were often sought for their lighter weight relative to steel, which ultimately increases fuel economy of the vehicle. However, the formation of such frames use different manufacturing processes than traditionally used in the formation of steel frames.

In order to use such seat back frames in vehicles, these alternative materials must provide adequate rigidity and resistance to failure. For example, automotive seat backs must pass tests standardized by the National Highway Traffic & Safety Administration (NHTSA) in the United States and similar regulatory bodies in other countries. As such, it would be advantageous to develop a method for forming a frame of a seat back for a vehicle from materials other than steel wherein the method results in a frame that provides proper rigidity and resistance to failure to pass standardized regulatory tests.

SUMMARY OF THE INVENTION

Accordingly, the present invention is a method of forming a frame of a seat back for a vehicle, the frame including a first polymeric material and a reinforcing composite layer that includes a second polymeric material and a plurality of fibers impregnated in the second polymeric material. The method includes the steps of supporting the reinforcing composite layer on moveable members in a mold, extending the moveable members relative to the mold to an extended position in the mold, and introducing the first polymeric material in a molten state into the mold and into contact with the reinforcing composite layer. The method also includes the steps of displacing the reinforcing composite layer away from the moveable members by introducing the first polymeric material in the molten state between the moveable members and the reinforcing composite layer while the moveable members are in the extended position, solidifying the first polymeric material in the mold, and retracting the moveable members from the first polymeric material.

One advantage of the present invention is that the method provides for proper placement of the reinforcing composite layer relative to the first polymeric material as the first polymeric material is introduced into the mold. This proper placement of the reinforcing composite layer provides the finished frame with adequate rigidity and resistance to failure. Specifically, the frame has adequate rigidity and resistance to failure to pass standardized regulatory tests such as those required by NHTSA and other regulatory bodies. In addition, the frame formed of the first polymeric material and the reinforcing composite layer is light-weight, e.g., is typically lighter than a comparable steel frame. The frame formed of the first polymeric material and the reinforcing composite layer is typically also more compact than a comparable steel frame, which reduces packaging constraints. The frame formed of the first polymeric material and the reinforcing composite layer may also be easier to recycle than a traditional steel frame.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
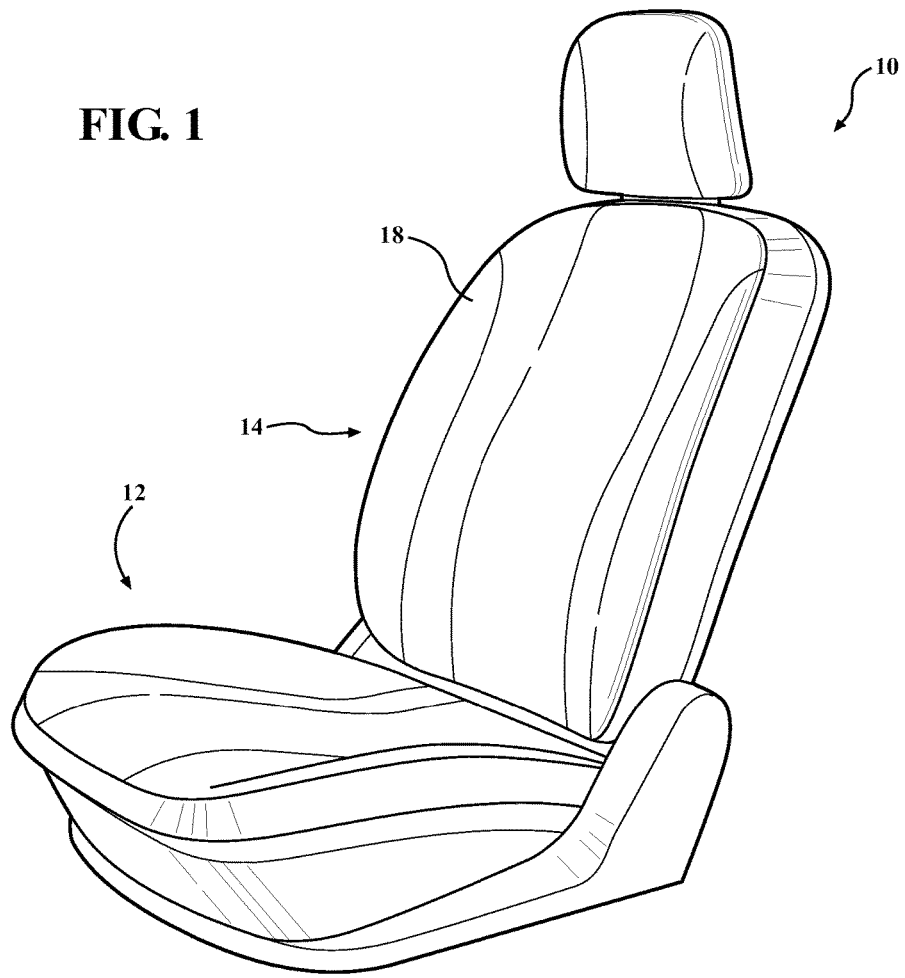
FIG. 1 is a perspective view of one embodiment of a seat assembly, according to the present invention.

Referring to the Figures, wherein like numerals indicate like parts throughout the several views, one embodiment of a seat assembly 10, according to the present invention, is generally shown. With reference to FIG. 1, the seat assembly 10 includes a seat bottom 12 extending generally horizontally and a seat back 14, according to one embodiment of the present invention, extending generally vertically from the seat bottom 12 for supporting an occupant (not shown). It should be appreciated that the seat assembly 10 is disposed in a vehicle (not shown) such as, for example, an automobile, an airplane, a train, a boat, etc.

Figure 2:
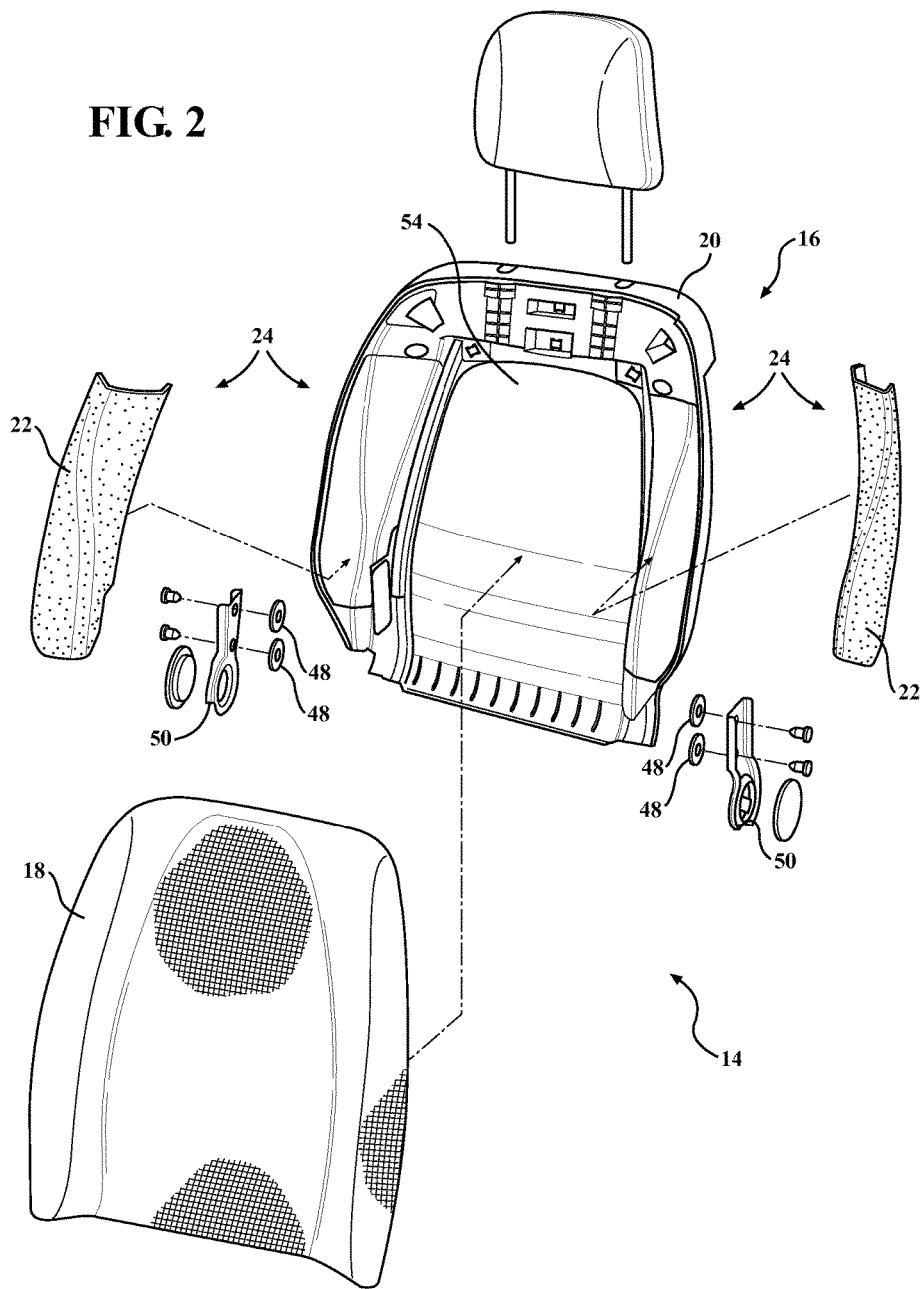
FIG. 2 is an exploded view of one embodiment of a seat back, according to the present invention, of the seat assembly of FIG. 1.

As illustrated in FIG. 2, the seat back 14 includes a frame 16, according to one embodiment of the present invention. Padding 18 can be mounted to a front side of the frame 16 and a rear side of the frame 16 is typically uncovered, as described further below. The frame 16 is connected to a mounting bracket 50 attached to the seat bottom 12.

Figure 3:
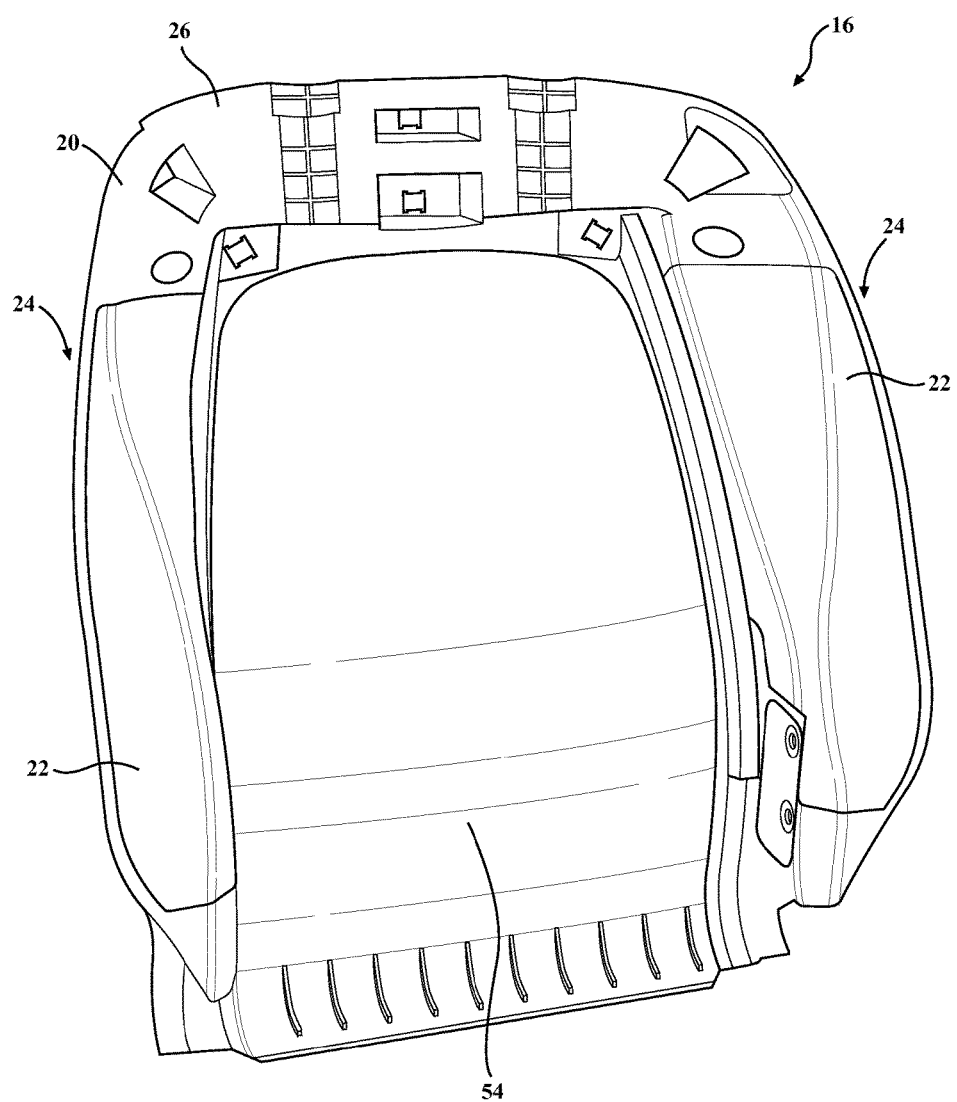
FIG. 3 is a perspective view of a front of a frame, according to the present invention, of the seat back of FIG. 2.
Figure 4:
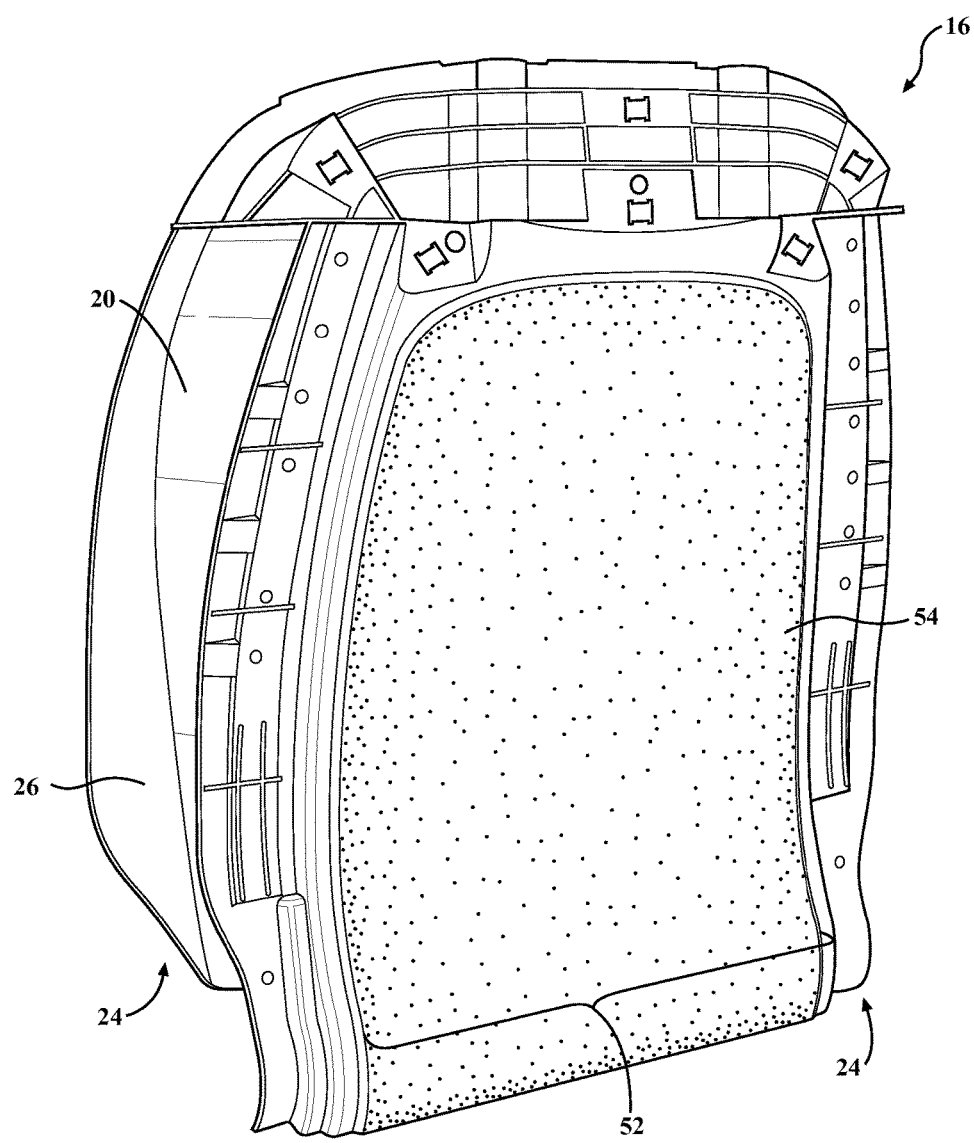
FIG. 4 is a perspective view of a back of the frame of FIG. 3.

Referring to FIGS. 2-4, the frame 16 includes a body 20 and at least one reinforcing composite layer 22. For example, the frame 16 includes two reinforcing composite layers 22, i.e., a reinforcing composite layer 22 and a second reinforcing composite layer 22 spaced from the reinforcing composite layer 22. It should be appreciated that FIG. 2 shows the reinforcing composite layers 22 are exploded from the body 20 merely to show the physical relationship of the components and that, once the body 20 is formed, the reinforcing composite layers 22 are fixed to, and not removable from, the body 20, as discussed further below.

The frame 16 includes two pillars 24 spaced from each other and a panel 54 extending from one pillar 24 to the other pillar 24. The body 20 defines the panel. The body 20 and the reinforcing composite layer 22 define one pillar 24 and the body 20 and the second reinforcing composite layer 22 define the other pillar 24. The pillars 24 extend upwardly in a vertical direction from the seat bottom 12. It should be appreciated that the panel 54 is recessed relative to the pillars 24 to support the torso of the occupant between the pillars 24.

The reinforcing composite layer 22 reinforces the pillars 24. In the embodiment illustrated in FIGS. 2-4, the reinforcing composite layer 22 and the second reinforcing composite layer 22 are elongated in a vertical direction along the pillars 24, respectively, to reinforce the pillars 24. It should be appreciated that the frame 16 can include additional reinforcing composite layers (not shown) integrated with other portions of the frame 16, e.g., the panel 54.

The body 20 is formed of a polymeric material, hereinafter referred to as the first polymeric material 26 for identification purposes. Typically, the first polymeric material 26 is a thermoplastic material and, in any event, can be heated to a pliable or molten state to be shaped. For example, the first polymeric material 26 is capable of being injection molded such that the first polymeric material 26 can be molded into variety of configurations and shapes. Whether injection molded or otherwise, as set forth further below, the first polymeric material 26 is over molded onto the reinforcing composite layers 22 to integrate the first polymeric material 26 with the reinforcing composite layers 22. In other words, the reinforcing composite layers 22 are fixed to, and not removable from, the first polymeric material 26 e.g., by melt bonding. Said differently, the reinforcing composite layers 22 are integrally formed to form a one-piece frame 16.

In the embodiment where the first polymeric material 26 is injection molded, the first polymeric material 26 is typically of the type that produces a net-shaped product resulting from injection molding, i.e., is finished when removed from a mold. In other words, the first polymeric material 26 of the frame 16 requires no secondary finishing operations after removal from the mold.

The first polymeric material 26 can be, for example, nylon, which will be hereinafter referred to as a first nylon for identification purposes. As one example, the first nylon is fiber reinforced nylon and an example of such fiber reinforced nylon is a glass fiber reinforced nylon that is commercially available from BASF Corporation in Florham Park, N.J. under the tradename Ultramid® TG7S PA6. It should be appreciated that the frame 16 may be formed from any type of suitable polymeric material, reinforced or not, without departing from the nature of the present invention such as, for example, acrylonitrile butadiene styrene (ABS).

Figure 7A:
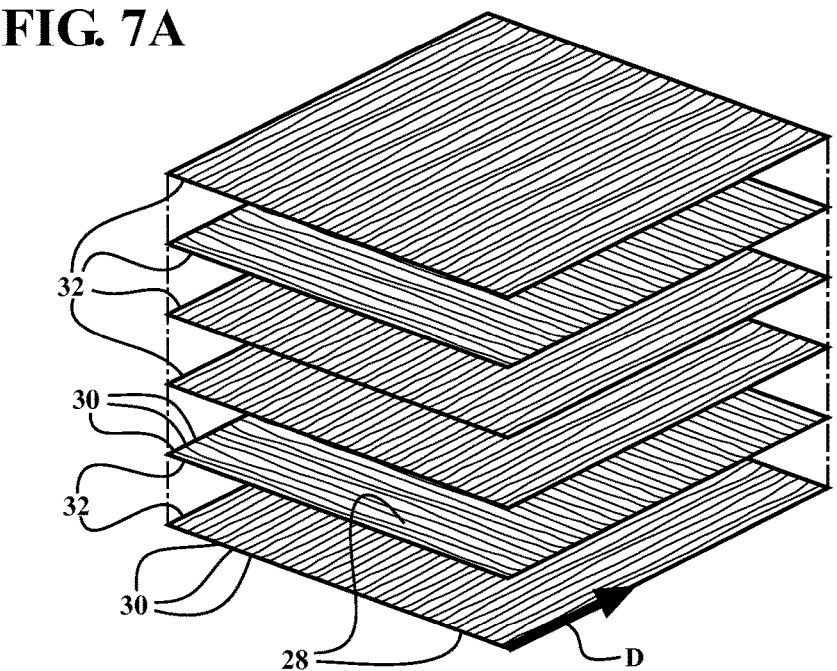
FIG. 7A is an exploded view of a plurality of sheets that form the reinforcing composite layer of FIG. 5.
Figure 7B:
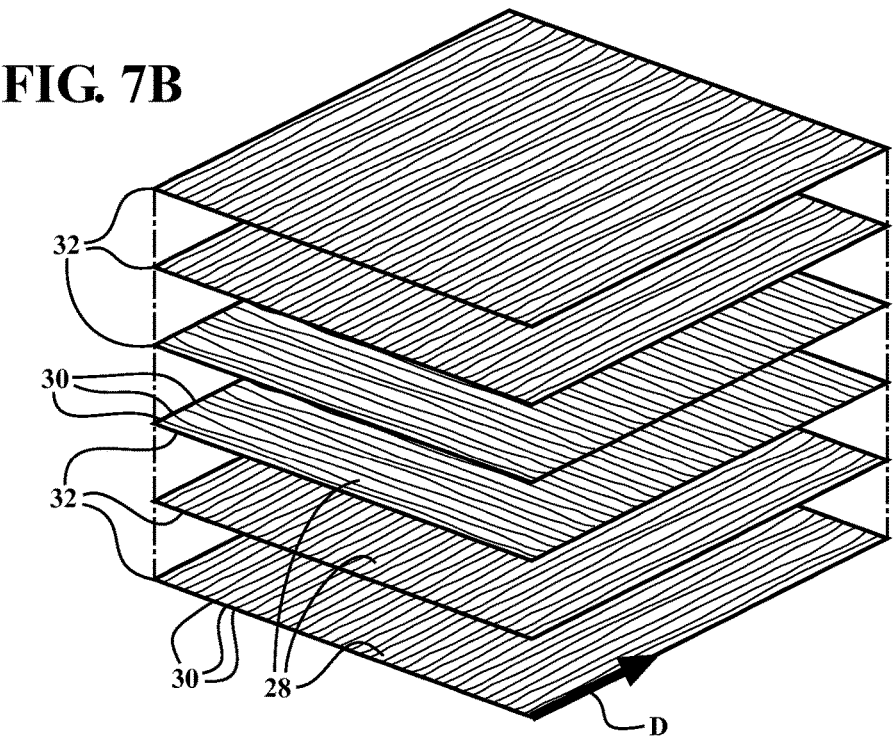
FIG. 7B is an exploded view of another embodiment, according to the present invention, of the plurality of sheets of FIG. 7A.
Figure 7C:
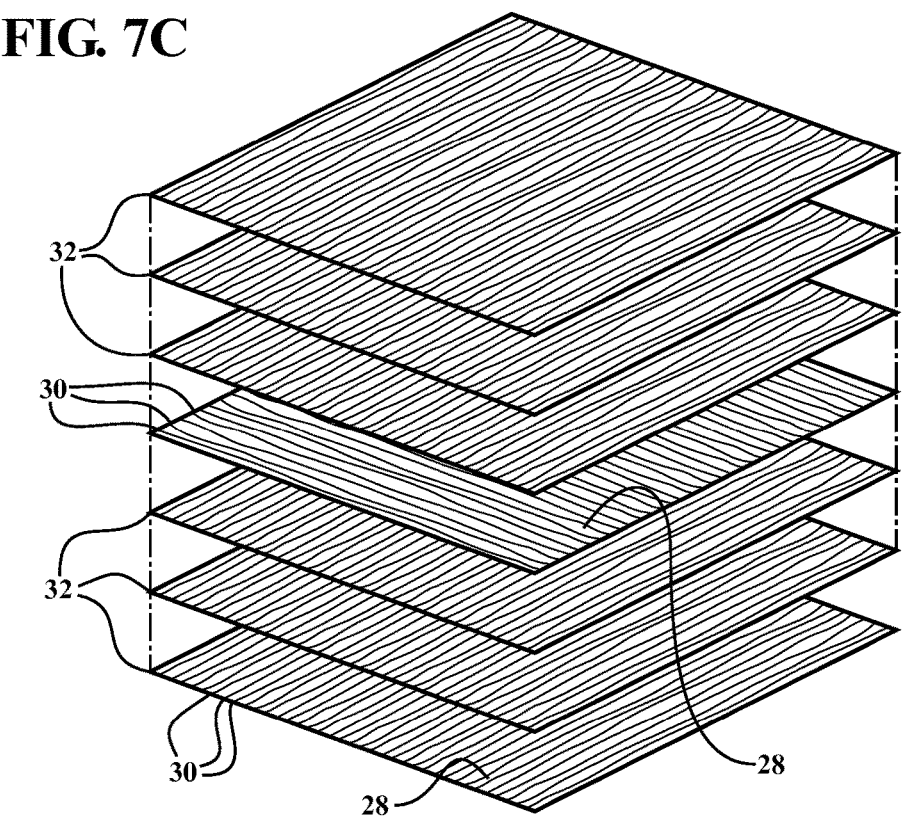
FIG. 7C is an exploded view of yet another embodiment, according to the present invention, of the plurality of sheets of FIG. 7A.

Referring to FIGS. 7A-C, the reinforcing composite layer 22 is formed of a polymeric material, hereinafter referred to as a second polymeric material 28 for identification purposes, and a plurality of fibers 30, i.e., strands, impregnated in the second polymeric material 28. Typically, the first polymeric material 26 and the second polymeric material 28 of the reinforcing composite layer 22 are compatible such that the first polymeric material 26 and the second polymeric material 28 of the reinforcing composite layer 22 melt together and integrate with one another, as described further below.

The reinforcing composite layer 22 can include a plurality of sheets 32, as shown in FIGS. 7A-C. It should be appreciated that the sheets 32 shown in FIGS. 7A-C are formed in the shape of the reinforcing composite layer 22 shown in FIG. 5 before being integrated with the first polymeric material 26.

An example of the reinforcing composite layer 22 is a continuous fiber reinforced thermoplastic that is commercially available from Baycomp Canada in Burlington, Ontario, Canada under the tradename CFRT. Alternatively, for example, the plurality of fibers 30 and the second polymeric material 28 are simultaneously integrated with the first polymeric material 26. Various embodiments of the reinforcing composite layer 22 are described further below with reference to FIGS. 7A-C. The reinforcing composite layer 22 may be, for example, preformed and subsequently integrated with the first polymeric material 26, as set forth further below with reference to FIG. 8. In the alternative to, or in addition to the sheets 32, the reinforcing composite layer 22 can include tape, prepregs, etc., and the reinforcing composite layer 22 can be formed by any type of composite manufacturing method without departing from the nature of the present invention.

The second polymeric material 28 of the reinforcing composite layer 22 can be the same material or a different material than the first polymeric material 26. As one example, in the embodiment where the first polymeric material 26 is a thermoplastic material, the second polymeric material 28 of the reinforcing composite layer 22 can be a thermoplastic material different than the thermoplastic material. It should be appreciated that in such an embodiment the thermoplastic material and the thermoplastic material of the reinforcing composite layer 22 can be any type of thermoplastic. As one example, the second polymeric material 28 of the reinforcing composite layer 22 is a second nylon different than the first nylon.

Alternatively, the second polymeric material 28 of the reinforcing composite layer 22 can be the same material as the first polymeric material 26. As one example of such a configuration, the first nylon and the second nylon of the reinforcing composite layer 22 can be the same type of nylon. It should be appreciated that the second polymeric material 28 of the reinforcing composite layer 22 may alternatively be a thermoset material without departing from the nature of the present invention.

As best shown in FIGS. 7A-C, typically the fibers 30 are further defined as continuous fibers 30, i.e., long fibers, as opposed to discontinuous fibers, i.e., short fibers. It should be appreciated that, alternatively, the plurality of fibers are discontinuous, i.e., short fibers (not shown). In the embodiment where the fibers 30 are continuous, the fibers 30 are elongated, i.e., relatively long and thin, and are aligned generally in parallel with each other such that stress on the reinforcing composite layer 22 is transmitted from the second polymeric material 28 to the fibers 30 such that the fibers 30 reinforce the second polymeric material 28. In other words, the stress is transferred to the fibers 30 to limit and/or control the deformation of the second polymeric material 28 when the reinforcing composite layer 22 is subjected to a load. More specifically, some amount of deformation occurs although the load is transferred to the reinforcing composite layer 22.

The fibers 30 are impregnated and coated with the second polymeric material 28. In the case of continuous fibers 30, the fibers 30 each, for example, extend in generally the same direction and extend along a length of the reinforcing composite layer 22. In the configuration where the fibers 30 of the reinforcing composite layer 22 are continuous fibers 30, the reinforcing composite layer 22 by itself is flexible about an axis extending along the continuous fibers 30 and is subject to buckling when subjected to a load. The first polymeric material 26 supports the reinforcing composite layer 22 to prevent flexing about the axis and to prevent buckling when subjected to a load. In the configuration where the fibers 30 are discontinuous, the second polymeric material 28 deforms around the fibers 30 and little stress is transferred from the second polymeric material 28 to the fibers 30.

Whether continuous, discontinuous, or otherwise, the fibers 30 of the individual reinforcement layer typically extend generally in the same direction. Alternatively, the fibers 30 of the individual sheets 32 may extend in different directions or may be woven, i.e., interlaced with each other. The plurality of fibers 30 of the reinforcing composite layer 22 are preferably glass fibers 30. Alternatively, each the plurality of fibers 30 are carbon fiber; however, it should be appreciated that the fiber may be of any type known to one skilled in the art.

As set forth above, and with reference to FIGS. 7A-C, the reinforcing composite layer 22 can include a plurality of sheets 32. In such a configuration, the sheets 32 are integrally stacked upon each other forming a single stack. The stiffness, strength, and impact strength of the reinforcing composite layer 22 is increased with the addition of each sheet 32. Each sheet 32 is thin relative to the overall thickness of the frame 16 and the relative to the thickness of the first polymeric material 26. Each of the sheets 32 may be approximately 0.1 mm to approximately 0.5 mm thick. The plurality of sheets 32 forming the single stack may have a total thickness of approximately 1 mm to approximately 2 mm. However, it should be appreciated that the reinforcing composite layer 22 can have any thickness without departing from the nature of the present invention. It should also be appreciated that the reinforcing composite layer 22 can have uniform thickness or can have varying thickness.

The plurality of sheets 32 may include any combination of sheets 32 having continuous or discontinuous fibers 30. For example, the plurality of sheets 32 may include a sheet 32 having the continuous fibers 30, a plurality of sheets 32 having woven fibers 30, or a combination of at least one sheet having continuous fibers 30 and at least sheet having woven fibers 30.

In the configuration where the reinforcing composite layer 22 includes the plurality of sheets 32, the material of the fibers 30 of each sheet may be the same as or different than the fibers 30 of each of the other sheets 32. For example, the fibers 30 of each of the sheets 32 may be glass fibers 30, the fibers 30 of each of the sheets 32 may be carbon fibers 30, or the plurality of sheets 32 may include a combination of one or more sheets 32 having glass fibers 30 and one or more sheets 32 having carbon fibers 30.

With continued reference to FIGS. 7A-C, in the configuration where the fibers 30 of each of the sheets 32 are continuous fibers 30, typically at least a first sheet is oriented with the continuous fibers 30 extending in a first direction D and at least a second sheet is oriented with the continuous fibers 30 extending angularly relative to the first direction D. In other words, the plurality of sheets 32 may be arranged such that the fibers 30 of at least one sheet extend angularly relative to the fibers 30 of other sheets 32. It should be appreciated that sheets 32 can be oriented such that the fibers 30 of one sheet can extend at any angle relative to the fibers 30 of another sheet. Alternatively, the plurality of sheets 32 may be arranged such that the continuous fibers 30 of each sheet extend in parallel with the fibers 30 of the other sheets 32.

Several configurations of the plurality of sheets 32 are shown in FIGS. 7A-C. Specifically, FIG. 7A shows an exploded view of one embodiment of a configuration of the plurality of sheets 32 including six sheets 32 each having continuous fibers 30. Moving upwardly from the bottom in the configuration illustrated in FIG. 7A, one sheet has fibers 30 extending in the first direction D, the next sheet has fibers 30 extending generally at 90° relative to the first direction D, the next two sheets 32 each have fibers 30 extending generally along the first direction D, the next sheet has fibers 30 extending generally at 90° relative to the first direction D, and the next sheet has fibers 30 extending along the first direction D.

FIG. 7B shows an exploded view of another embodiment of a configuration of the plurality of sheets 32 including six sheets 32 each having fibers 30 that are continuous fibers 30. Moving upwardly from the bottom in the configuration illustrated in FIG. 7B, two sheets 32 each have fibers 30 extending in the first direction D, the next two sheets 32 each have fibers 30 extending generally at 90° relative to the first direction D, and the next two sheets 32 each have fibers 30 extending generally in the first direction D.

FIG. 7C shows an exploded view of yet another embodiment of a configuration of the plurality of sheets 32 including seven sheets 32 each having fibers 30 that are continuous fibers 30. Moving upwardly from the bottom in the configuration illustrated in FIG. 7C, three sheets 32 each have fibers 30 extending in the first direction D, the next sheet has fibers 30 extending at 90° relative to the first direction D, and the next three sheets 32 each have fibers 30 extending in the first direction D.

Figure 5:
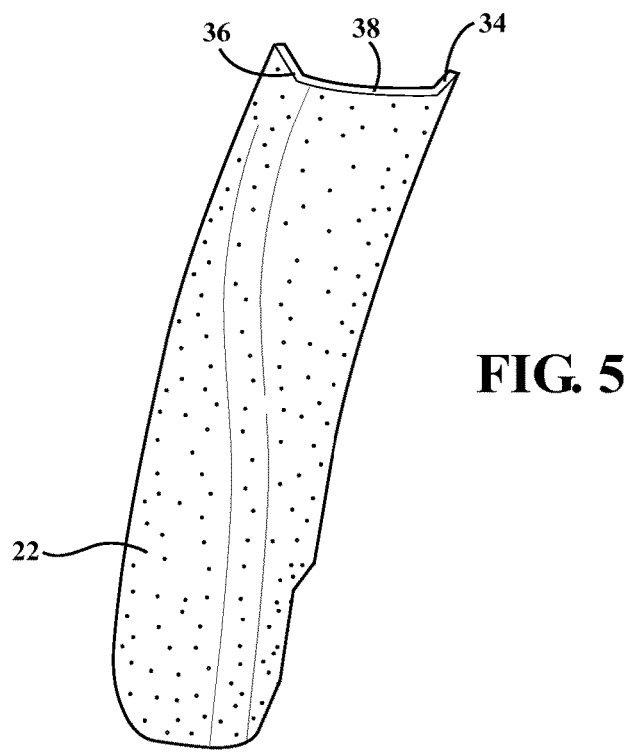
FIG. 5 is a perspective view of a reinforcing composite layer of the frame of FIG. 3.
Figure 8:
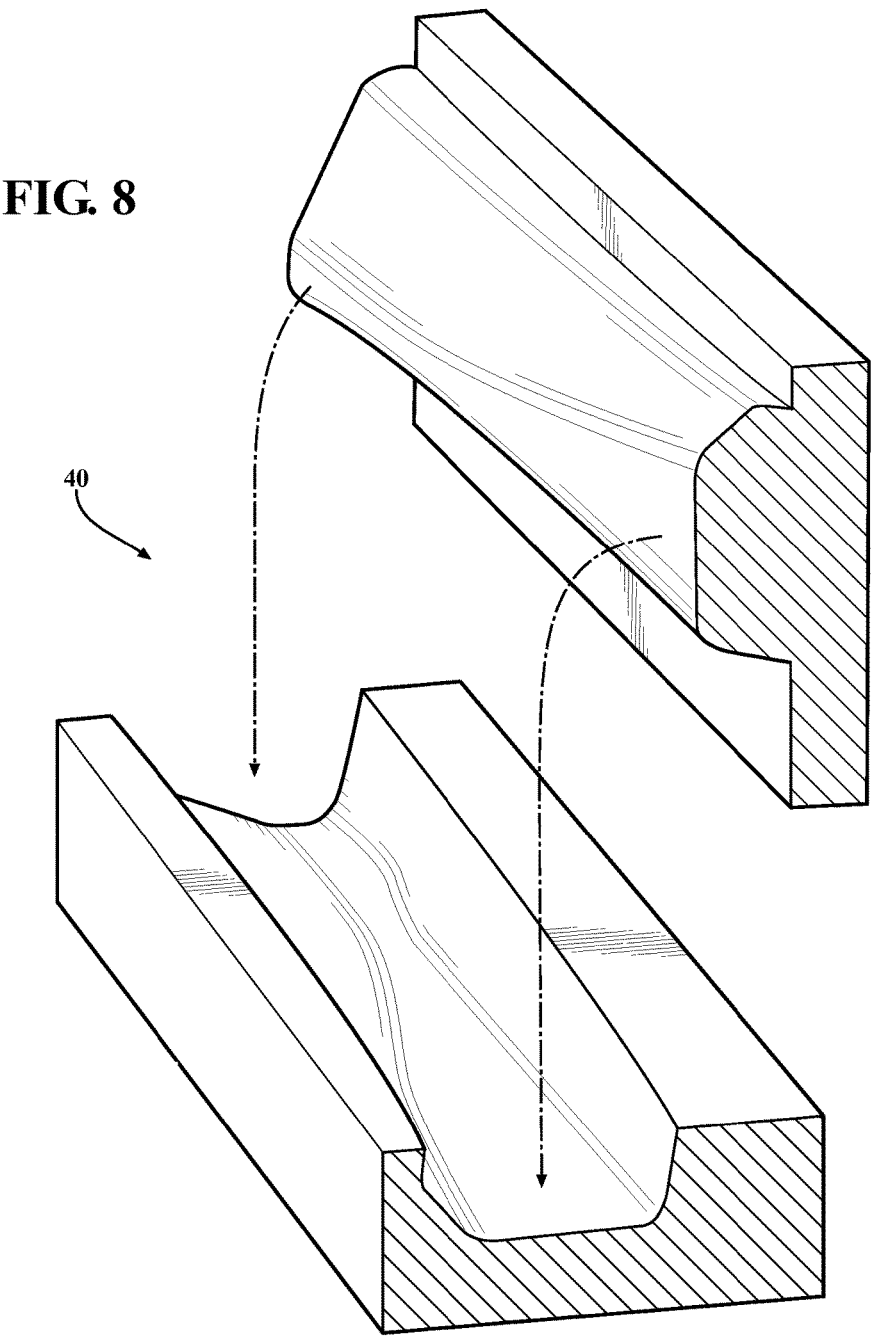
FIG. 8 is a perspective view of a mold for forming the reinforcing composite layer of FIG. 5.

Referring to FIG. 5, the reinforcing composite layer 22 includes a first leg 34, a second leg 36 spaced from the first leg 34, and a base 38 extending between the first leg 34 and the second leg 36. The reinforcing composite layer 22 is shaped with the use of a mold 40, as shown in FIG. 8. Specifically, after the sheets 32 are combined, the sheets 32 are shaped with the mold 40.

Figure 6:
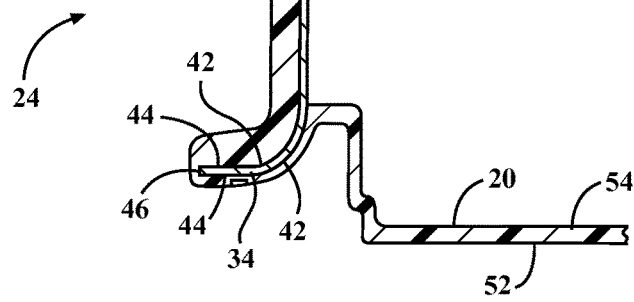
FIG. 6 is a cross-sectional view of a portion of the frame of FIG. 3 including one pillar and a portion of a panel.

With reference to FIG. 6, the first polymeric material 26 of the body 20 is melt bonded to the second polymeric material 28 of the reinforcing composite layers 22. This melt bonding integrates the first polymeric material 26 with the second polymeric material 28 to form a single integral component, as set forth above.

The integration of the first polymeric material 26 and the reinforcing composite layers 22 results in an advantageous combination. Specifically, the first polymeric material 26 by itself may fracture when subjected to a load and the reinforcing composite layers 22, by themselves, may buckle and/or fracture when subjected to a load. When the first polymeric material 26 is integrated with the reinforcing composite layers 22, the first polymeric material 26 supports the reinforcing composite layers 22 to prevent buckling and/or fracturing of the reinforcing composite layers 22, i.e., to provide torsional stiffness. The reinforcing composite layers 22 reinforce the first polymeric material 26 to prevent fracturing of the first polymeric material 26 under a load. In other words, the reinforcing composite layers 22 provide increased stiffness and impact strength to the frame 16.

The reinforcing composite layers 22 can be integrated with the first polymeric material 26 in a variety of ways. In one configuration, the frame 16 includes an adhesive layer (not shown) disposed between the first polymeric material 26 of the body 20 and the second polymeric material 28 of the reinforcing composite layers 22. In such a configuration, the adhesive layer is selected to have properties such that the adhesive layer is conducive to melt bonding with both the first polymeric material 26 and the second polymeric material 28. Such a configuration increases the range of materials from which the first polymeric material 26 and the second polymeric material 28 may be selected from because in such a configuration the first polymeric material 26 and the second polymeric material 28 need not be melt bondable to each other but instead can be melt bondable to the adhesive layer. One example of the adhesive layer is a polyurethane layer. However, it should be appreciated that the adhesive layer can be any type of material without departing from the nature of the present invention.

Referring to FIG. 6, the body 20 and the reinforcing composite layers 22 present abutting surfaces 42. The second polymeric material 28 of the reinforcing composite layer 22 is integrated with the first polymeric material 26 of the body 20 along the abutting surfaces 42 to attach the reinforcing composite layers 22 to the body 20. The integration of the body 20 and the reinforcing composite layers 22 along the abutting surfaces 42 typically extends along a relatively long uninterrupted interface. This uninterrupted interface increases the strength of the integration between the body 20 and the reinforcing composite layers 22.

With continued reference to FIG. 6, the reinforcing composite layer 22 is interposed between the first polymeric material 26 of the body 20. In other words, the first polymeric material 26 of the body 20 sandwiches the reinforcing composite layer 22. The reinforcing composite layer 22 includes sides 44 and the first polymeric material 26 contacts both sides 44. The reinforcing composite layer 22 presents an edge 46 between the sides 44 and the first polymeric material 26 contacts the edge 46.

The first polymeric material 26 of the body 20 and the second polymeric material 28 of the reinforcing composite layers 22 are melt bonded to each other along the abutting surfaces 42. For example, the second polymeric material 28 of the reinforcing composite layers 22 can have a melting temperature, herein referred to as a second melting temperature, lower than a melting temperature of the first polymeric material 26, herein referred to as a first melting temperature. For example, the first melting temperature is 560-600° F. and the second melting temperature is 400-560° F. However, it should be appreciated that the second polymeric material 28 can have the same melting temperature than the first polymeric material 26 without departing from the nature of the present invention.

In the alternative or in addition to melt bonding, the body 20 can be mechanically interlocked with the reinforcing composite layers 22. For example, the reinforcing composite layers 22 can define holes (not shown) or protrusions (not shown) and the body 20 extends through and engages the reinforcing composite layer 22 through the hole and/or engages the protrusions.

Referring to FIG. 2, the frame 16 includes mounting elements 48 for engaging the mounting bracket 50. With reference to FIG. 2, for example, two mounting elements 48 spaced from each other are attached to each pillar 24. The mounting elements 48 are anchored to the body 20 and are coupled to the seat bottom 12 to connect the frame 16 to the seat bottom 12. The mounting elements 48 are formed of a second material different than the first polymeric material 26 of the body 20. Typically, the second material of the mounting elements 48 is further defined as metal such as, for example, steel.

The mounting bracket 50 includes features for attaching other components to the mounting bracket 50 and for attaching the mounting bracket 50 to the seat bottom 12. It should be appreciated that fasteners, for example, can connect the mounting bracket 50 to the mounting elements 48.

The mounting bracket 50 can be configured to establish a reclining interaction between the frame 16 and the seat bottom 12, i.e., so that the seat back 14 can selectively rotate backward relative to the seat bottom 12 and/or can selectively rotate forward relative to the seat bottom 12. Alternatively, the mounting bracket 50 can be configured such that the seat back 14 remains fixed in the upright position.

The mounting elements 48 are overmolded by the first polymeric material 26 of the body 20. In other words, the first polymeric material 26 is formed around features of the mounting elements 48 such that the polymeric material mechanically engages the mounting elements 48. Typically, the first polymeric material 26 is mechanically engaged with the mounting elements 48 free of any melt bonding between the first polymeric material 26 of the body 20 and the second material of the mounting elements 48. The mounting elements 48 can form an interlocking configuration (not shown) engaged with the first polymeric material 26. For example, the interlocking configuration of the mounting elements 48 can include holes to mechanically engage the first polymeric material 26 of the body 20. Alternatively or in addition to the holes, the interlocking configuration can include other features protruding from the mounting elements 48 such as studs, hooks, etc.

As set forth above, the body 20 can be formed by heating the first polymeric material 26 to a pliable or molten state, e.g., by injection molding, and in such a state the first polymeric material 26 can be molded about the mounting elements 48. In such an embodiment, the first polymeric material 26 of the body 20 in the pliable or molten state contacts the interlocking configuration, e.g., flows into the holes, such that upon solidification of the first polymeric material 26, the first polymeric material 26 and the mounting elements 48 are mechanically engaged with one another.

Referring to FIG. 4, the first polymeric material 26 of the body 20 presents an uncovered aesthetic show surface 52, i.e., a surface that passes industry standards for aesthetics and does not need to be covered by, for example, leather, foam, etc. The uncovered aesthetic show surface 52 can be referred to in industry as a "class A surface." Alternatively, or in addition, the body 20 can define features for engaging the covering to retain the covering to the frame 16.

The uncovered aesthetic show surface 52 can, for example, extend from the first pillar 24 to the second pillar 24 across the panel 54, as illustrated in FIG. 4. The uncovered aesthetic show surface 52 extending from the first pillar 24 to the second pillar 24 across the panel 54 eliminates the need for a covering on the panel 54 of the seat back 14, thereby reducing material and labor cost associated with manufacturing the seat back 14.

It should be appreciated that the body 20 and/or the reinforcing composite layers 22 can define features of the seat back 14. For example, with reference to FIGS. 2-4, the first polymeric material 26 of the body 20 defines headrest guides for receipt of a headrest. Alternatively or in addition, the body 20 and the reinforcing composite layers 22 can form, a back panel, side bolsters, trim attachments, foam supports, back supports, armrest mounts, lumbar support, airbag mounts and/or housing, back suspension mounts, etc. and any combination thereof. It should also be appreciated that the seat back features may further define the uncovered aesthetic show surface. For example, in the scenario where the frame 16 is formed by plastic injection molding, the seat back features can be formed along with the frame 16 by plastic injection molding.

Figure 9:
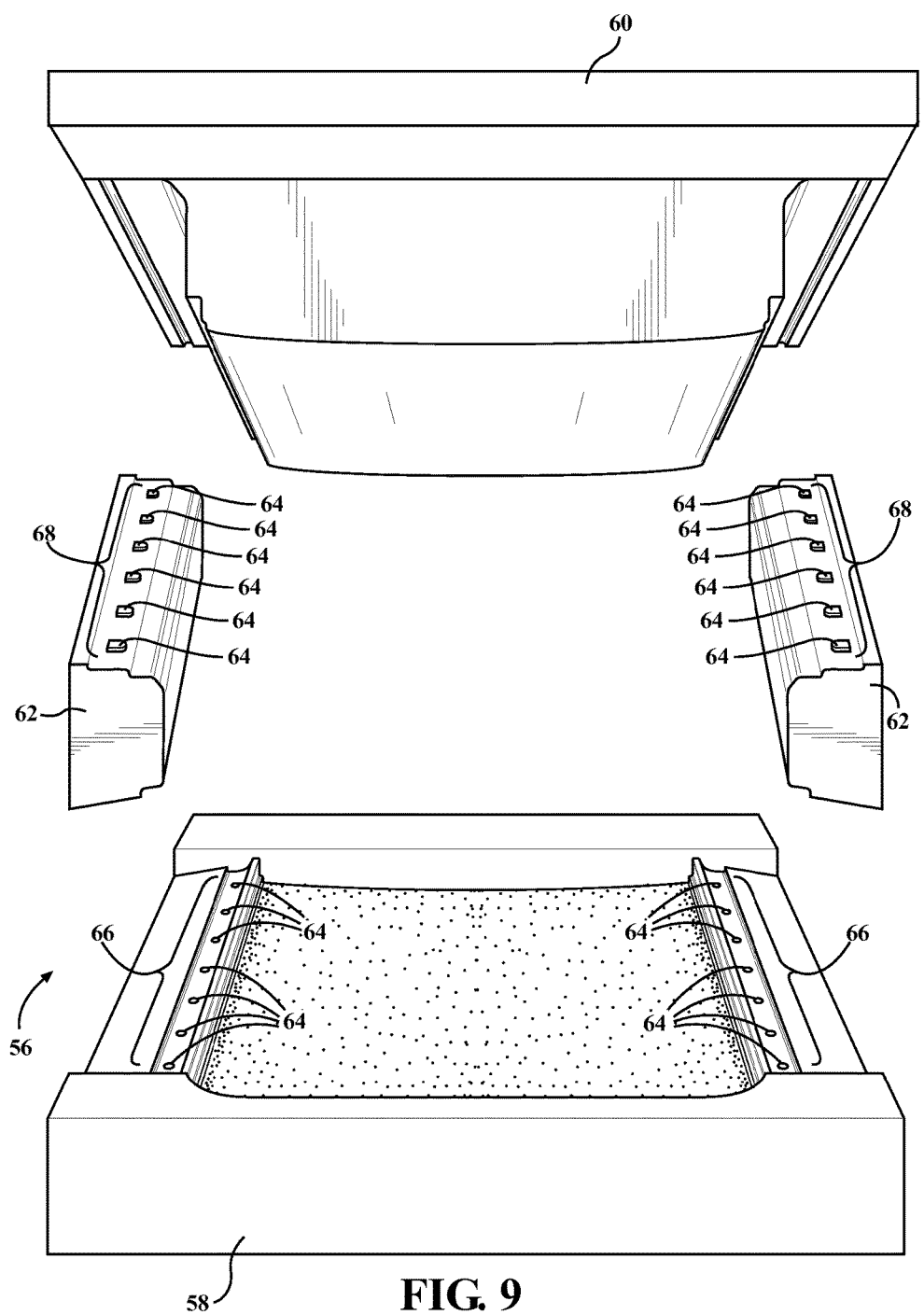
FIG. 9 is an exploded view of a mold for forming the frame of FIGS. 3 and 4 from a first polymeric material and the reinforcing composite layer.

The present invention further includes a method, according to one embodiment of the present invention, of forming the frame 16 of the seat back 14 for the vehicle. The frame 16 is formed with the use of the mold 56 illustrated in FIG. 9. The mold 56 includes a cavity 58, a core 60, and at least one slider 62 configured to open relative to the cavity 58 and/or the core 60. As illustrated in FIG. 9, for example, the mold 56 includes two sliders 62 that form the pillars 24 during the molding process. It should be appreciated that the shape of the interior of the mold 56 in FIG. 9 is generally shown and does not include all of the details of the frame 16 shown in the Figures merely for the purpose of simplicity. Although not shown in FIG. 9, the interior of the mold 56 includes shapes and contours configured to form the frame 16 shown in the Figures.

Figure 10:
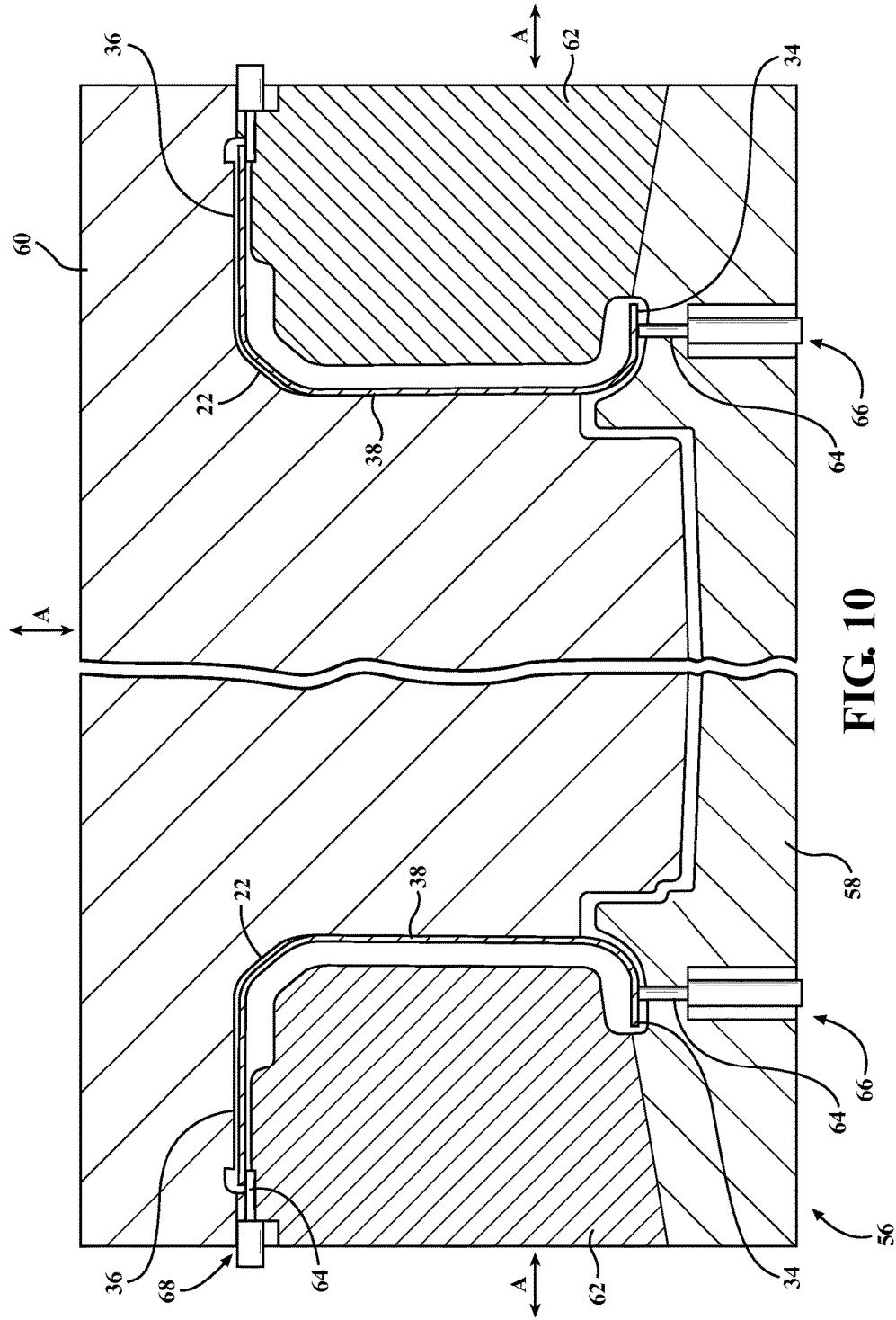
FIG. 10 is a cross-sectional view of the mold of FIG. 9 with the reinforcing composite layer in the mold prior to introduction of the first polymeric material.
Figure 11:
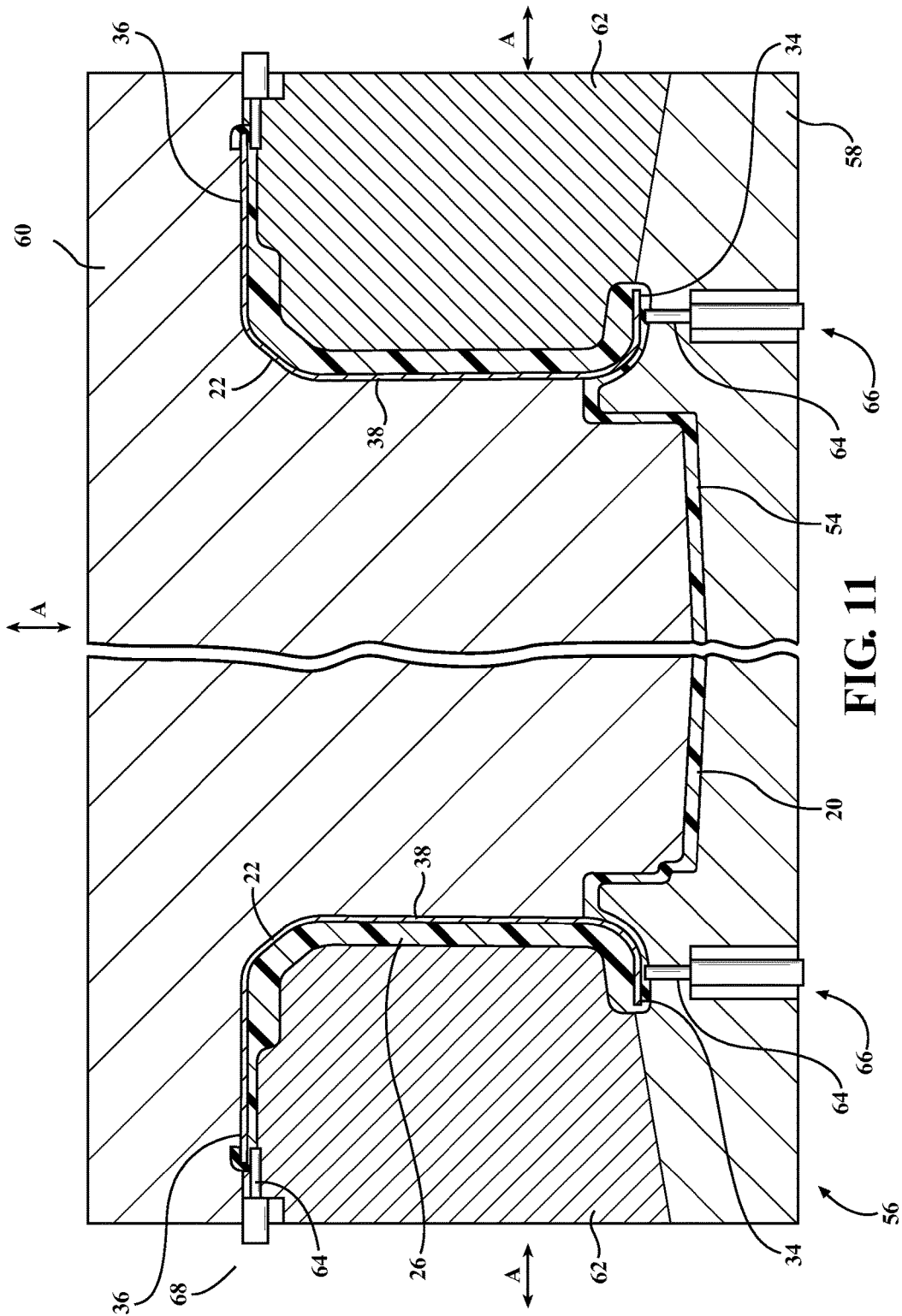
FIG. 11 is the cross-sectional view of the mold of FIG. 10 with the first polymeric material introduced into the mold.

The cavity 58, the core 60, and the sliders 62 are moveable relative to each other between a closed position for plastic injection into the mold 56 and an open position for introduction of the reinforcing composite layers 22 prior to molding and removal of the frame 16 after molding. The cavity 58 typically remains stationary and the core 60 and the sliders 62 are moveable between the open and closed positions. Arrows A are shown in FIGS. 10-11 to illustrate the movement of the core 60 and the sliders 62.

Moveable members 64 are moveably supported by the mold 56. The moveable members 64 are slideably supported by the mold 56 and are configured to be moved between extended and retracted positions. For example, the moveable members 64 are shown in the extended position in FIG. 10 and in the retracted position in FIG. 11.

At least one of the cavity 58 and the core 60 supports a first group 66 of moveable members 64. For example, as shown in FIGS. 9-11, the cavity 58 supports the first group 66 of moveable members 64. The sliders 62 support a second group 68 of moveable members 64.

The method includes the step of introducing the reinforcing composite layers 22 into the mold 56. With the core 60 and the sliders 62 in the open position, the reinforcing composite layers 22 are placed on the sliders 62, respectively. Specifically, the method includes placing the reinforcing composite layers 22 on the slides and subsequently moving the slides and the core 60 to the closed position to encase the reinforcing composite layer 22 in the mold 56, as illustrated in FIG. 10.

The method includes the step of introducing the mounting elements 48 into the mold 56. Typically, the mounting elements 48 are introduced into the mold 56 adjacent to the reinforcing composite layers 22 before the sliders 62 are moved to the closed position. The reinforcing composite layers 22 and the mounting elements 48 can abut each other or can be spaced from each other in the mold 56.

Referring to FIG. 10, the method includes the step of supporting the reinforcing composite layer 22 on the moveable members 64 in a mold 56. One side 44 of the reinforcing composite layer 22 contacts the moveable members 64 prior to introduction of the first polymeric material 26 into the mold 56. Specifically, the method includes extending the moveable members 64 relative to the mold 56 to the extended position in the mold 56. Typically, the moveable members 64 are moved to the extended position prior to placement of the reinforcing composite layer 22 on the sliders 62. Alternatively, the sliders 62 are moved to the extended position after the reinforcing composite layers 22 are placed on the sliders 62. Typically, the first group 66 of sliders 62 and the second group 68 of sliders 62 are simultaneously moved between the extended and retracted positions.

The step of supporting the reinforcing composite layer 22 includes supporting the first leg 34 of the reinforcing composite layer 22 with the first group 66 of moveable members 64 and supporting the second leg 36 with a second group 68 of moveable members 64, as illustrated in FIG. 10. Specifically, the first group 66 of moveable members 64 and the second group 68 of moveable members 64 are moved to the extended position to support the first leg 34 and the second leg 36, respectively.

With continued reference to FIG. 10, the method includes the step of suspending the reinforcing composite layer 22 spaced from the mold 56 on the moveable members 64 in the extended position prior to introduction of the first polymeric material 26 into the mold 56. In other words, the moveable members 64 are moved to the extended position to suspend the reinforcing composite layer 22 in the mold 56, i.e., to space the reinforcing composite layer 22 from the mold 56.

The method includes the step of introducing the first polymeric material 26 in a molten state into the mold 56 and into contact with the reinforcing composite layer 22. Specifically, the method includes the step of injecting the first polymeric material 26 for the body 20 into the mold 56 such that the body 20 is formed by the first polymeric material 26 and is integrated with the reinforcing composite layer 22, i.e., overmolding. In other words, the method includes the step of melting a portion of the second polymeric material 28 of the reinforcing composite layer 22 in contact with the first polymeric material 26 in the molten state to bond the reinforcing composite layer 22 to the first polymeric material 26 upon solidification of the first polymeric material 26.

Typically the first polymeric material 26 is heated and subsequently introduced into the mold 56, i.e., injection molding. In such a configuration, the step of introducing the first polymeric material 26 into the mold 56 includes injecting the first polymeric material 26 into the mold 56 under pressure.

The method includes the step of displacing the reinforcing composite layer 22 away from the moveable members 64 by introducing the first polymeric material 26 in the molten state between the moveable members 64 and the reinforcing composite layer 22 while the moveable members 64 are in the extended position. In other words, when the mold 56 is closed and the moveable members 64 are in the extended position, the introduction of the first polymeric material 26 in the molten state forces the reinforcing composite layers 22 away from the moveable members 64, i.e., the first polymeric material 26 lifts the reinforcing composite layers 22 from the moveable members 64. The first polymeric material 26 in the molten state fills in space between the reinforcing composite layers 22 and the moveable members 64 in the extended position, as illustrated in FIG. 11.

The moveable members 64 position the reinforcing composite layers 22. The step of displacing the reinforcing composite layers 22 allows the space between the moveable members 64 to be filled with the first polymeric material 26 in the molten state.

The step of displacing the reinforcing composite layer 22 includes abutting the reinforcing composite layer 22 against the mold 56 by flowing the first polymeric material 26 in the molten state against the one of the opposing sides. In other words, when the first polymeric material 26 in the molten state forces the reinforcing composite layers 22 against the mold 56. This properly locates the reinforcing composite layers 22 relative to the first polymeric material 26 to provide the desired relative positioning of the reinforcing composite layers 22 and the body 20.

The method includes the step of interposing the reinforcing composite layer 22 between the first polymeric material 26 in the molten state so that the first polymeric material 26 contacts two sides of the reinforcing composite layer 22. The core 60 and the slider 62 are configured to interpose the reinforcing composite layers 22 between the first polymeric material 26 as illustrated in FIG. 11. The position of the reinforcing composite layer 22 abutting the mold 56, for example, suspends a portion of the reinforcing composite layer 22 between the cavity 58 and the slider 62 allowing for interposition of the reinforcing composite layers 22 between the first polymeric material 26, as illustrated in FIG. 11.

The method includes the step of shaping the first polymeric material 26 in the molten state into the panel 54 of the frame 16 extending from the reinforcing composite layer 22 to the second reinforcing composite layer 22. Specifically, the method includes the step of positioning the reinforcing composite layer 22 on one slider 62 and positioning the second reinforcing composite layer 22 on the other slider 62. The method includes the step of introducing the first polymeric material 26 into contact with, and between, both the reinforcing composite layer 22 and the second reinforcing composite layer 22 to form the panel 54.

After the first polymeric material 26 is introduced into the mold 56, the method includes the step of solidifying the first polymeric material 26 in the mold 56 to form the body 20. Once the first polymeric material 26 is formed, the method includes the step of retracting the moveable members 64 from the first polymeric material 26. With the core 60 and the sliders 62 in the open position and the moveable members 64 in the retracted position, the frame 16 is removed from the mold 56.

The method can include the step of promoting interaction between the first polymeric material 26 of the body 20 and the second polymeric material 28 of the reinforcing composite layers 22 to integrate the body 20 and the reinforcing composite layers 22. The step of promoting the interaction between the first polymeric material 26 and the second polymeric material 28 encourages the combination of the body 20 and the reinforcing composite layers 22 into a single integral unit. In other words, when the first polymeric material 26 in the molten state is introduced into contact with the reinforcing composite layers 22, the first polymeric material 26 and the second polymeric material 28 of the reinforcing composite layer 22 interact with one another such that upon cooling, the body 20 and the reinforcing composite layers 22 are integral with each other, i.e., one-piece.

As set forth above, the step of promoting interaction is further defined as melt bonding the first polymeric material 26 and the second polymeric material 28. Specifically, the method includes the step of melting at least a portion of the second polymeric material 28 of the reinforcing composite layers 22 in contact with the first polymeric material 26 in the molten state to melt bond the reinforcing composite layers 22 and the first polymeric material 26 upon cooling. Melt bonding occurs when the first polymeric material 26 in the molten state interacts with the second polymeric material 28 while the second polymeric material 28 is in a heated softened state or a molten state. The first polymeric material 26 and the second polymeric material 28 interact with one another such that upon cooling the first polymeric material 26 and the second polymeric material 28 are bonded together. Specifically, heat may be transferred from the first polymeric material 26 in the molten state to the second polymeric material 28. The heat softens or melts the second polymeric material 28 and the softened or melted polymeric material interacts with the first polymeric material 26 in the molten state.

In the configuration where the first melting temperature of the first polymeric material 26 is greater than the second melting temperature of the second polymeric material 28, the step of introducing the first polymeric material 26 includes disposing the first polymeric material 26 at the first melting temperature into contact with the reinforcing composite layer 22 such that the second melting temperature is realized during contact to melt bond with the second polymeric material 28. When the first polymeric material 26 at the first melting temperature is introduced into contact with the reinforcing composite layer 22, heat is transferred from the first polymeric material 26 to the second polymeric material 28 such that the temperature of the second polymeric material 28 is increased to the first melting temperature, thereby at least softening, and typically melting, the second polymeric material 28.

In addition to heat transfer from the first polymeric material 26, the melting of the second polymeric material 28 may be promoted in a variety of ways. For example, the step of melting the second polymeric material 28 is further defined as heating the mold 56 to conductively heat the reinforcing composite layer 22. The reinforcing composite layer 22 is heated such that less heat energy is required from first polymeric material 26 in the molten state to raise the second polymeric material 28 to the second melting temperature.

The method may include the step of heating the reinforcing composite layer 22 prior to disposing the first polymeric material 26 in the molten state into contact with the reinforcing composite layer 22. For example, the method may include the step of heating the reinforcing composite layer 22 prior to placing the reinforcing composite layer 22 into the mold 56. Alternatively or in addition, the method may include the step of heating the reinforcing composite layer 22 while the reinforcing composite layer 22 is disposed in the mold 56.

The method may, for example, include the step of insulating the mold 56 near the interface of the first polymeric material 26 and the reinforcing composite layer 22. Specifically, in the configuration where introduction of the first polymeric material 26 into the mold 56 is further defined as plastic injection molding, the process of plastic injection molding heats the mold 56 and the step of insulating the mold 56 maintains heat in the mold 56. The heat of the mold 56 softens the second polymeric material 28 to foster melt bonding between the first polymeric material 26 and the second polymeric material 28 when the first polymeric material 26 is injected into the mold 56.

The method may include the step of heating the mold 56 near the interface of the first polymeric material 26 and the reinforcing composite layer 22. For example, the mold 56 may include heated oil lines (not shown) carrying heated oil. Heat is transmitted from the oil to the mold 56 to heat the mold 56. The heat transferred to the mold 56 by the oil lines softens the second polymeric material 28 to foster melt bonding between the first polymeric material 26 and the second polymeric material 28 when the first polymeric material 26 is introduced into contact with the second polymeric material 28.

The method may include the step of blowing heated air on the reinforcing composite layer 22 to heat the reinforcing composite layer 22. For example, the mold 56 may include an air pocket (not shown) and heated air is blown from the air pocket onto the reinforcing composite layer 22 when the reinforcing composite layer 22 is disposed in the mold 56. The heated air may be directed to blow on the reinforcing composite layer 22 at the interface of the first polymeric material 26 and the reinforcing composite layer 22 prior to introduction of the first polymeric material 26 to the interface. The heated air softens the second polymeric material 28 to foster melt bonding between the first polymeric material 26 and the reinforcing composite layer 22 when the first polymeric material 26 is introduced into contact with the reinforcing composite layer 22.

The method may include the step of plasma treating or flame treating the reinforcing composite layer 22 to relieve surface tension of the reinforcing composite layer 22. The plasma treatment or flame treatment (not shown) is applied to the reinforcing composite layer 22 at the interface of the first polymeric material 26 and the reinforcing composite layer 22 prior to introduction of the first polymeric material 26 to the interface. The plasma treatment or flame treatment of the reinforcing composite layer 22 reduces surface tension which promotes melt bonding between the first polymeric material 26 and the reinforcing composite layer 22.

The method may include the step of contacting the reinforcing composite layer 22 with plasma treat inserts (not shown) to heat the reinforcing composite layer 22. The plasma treat inserts are contacted with the reinforcing composite layer 22 at the interface of the first polymeric material 26 and the reinforcing composite layer 22 prior to introduction of the first polymeric material 26 to the interface. The plasma treat inserts are removed from the reinforcing composite layer 22 prior to the introduction of the first polymeric material 26 to the interface. The plasma treat inserts soften the reinforcing composite layer 22 to foster melt bonding between the first polymeric material 26 and the reinforcing composite layer 22 when the first polymeric material 26 is introduced into contact with the reinforcing composite layer 22.

Alternatively or in addition, the step of promoting interaction is further defined as mechanically interlocking the body 20 and the reinforcing composite layer 22. Specifically, the step is further defined as introducing the first polymeric material 26 of the body 20 in the molten state through surface features, e.g., holes, studs, hooks, surface contours, etc. (not shown), to mechanically engage the body 20 and the reinforcing composite layer 22 upon cooling of the first polymeric material 26. Upon cooling, the first polymeric material 26 is mechanically interlocked with the reinforcing composite layer 22. It should be appreciated that this mechanical engagement of the body 20 and the reinforcing composite layer 22 can be in addition to or in the place of the melt bond between the body 20 and the reinforcing composite layer 22. The first polymeric material 26 can be mechanically engaged with the reinforcing composite layer 22 in the place of melt bonding in a situation where the first polymeric material 26 and the polymer of the reinforcing composite layer 22 do not readily melt bond, e.g., incompatible material such as dissimilar thermoplastics or a thermoset, incompatible melt bond temperatures, etc.

Alternatively, or in addition to melt bonding and mechanical interlocking, the step of promoting interaction is further defined as scarifying the abutting surface of the reinforcing composite layer 22 prior to introduction of the first polymeric material 26 in the molten state into contact with the abutting surface. In other words, the abutting surface of the reinforcing composite layer 22 is roughened to promote melting of the reinforcing composite layer 22 at the abutting surface.

The step of promoting interaction is further defined as applying an adhesion promoter (not shown) onto the reinforcing composite layer 22 prior to disposing the first polymeric material 26 in the molten state into contact with the reinforcing composite layer 22. For example, the adhesion promoter is applied to the reinforcing composite layer 22 by spraying, brushing, and/or bathing. The adhesion promoter promotes the melt bonding between the first polymeric material 26 and the second polymeric material 28 of the reinforcing composite layer 22. An example of such an adhesion promoter is Gamma-aminopropyl triethoxysilane such as that commercially available from Dow Corning located in Midland, Mich. under the tradename Z-6011 Silane. Another example of such an adhesion promoter is Methylendiphenylbishexahydroazepincarboxamid such as that commercially available from EMS-Primid located in Sumter, S.C. under the tradename Grilbond IL-6.

The method also can include the step of preforming the reinforcing composite layer 22 into a predetermined shape prior to placing the reinforcing composite layer 22 into the mold 56, as set forth above with respect to FIG. 8. The step of preforming is further defined as thermoforming. Alternatively, the step of preforming is further defined as compression molding. As set forth above, the reinforcing composite layer 22 can be formed by any composite manufacturing method without departing from the nature of the present invention. In the configuration including the plurality of sheets 32, each sheet is combined as the single stack by compression thermoforming or compression molding. It should also be appreciated that the mold 56 can be configured such that the reinforcing composite layer 22 is bent or deformed when placed in the mold 56 such that the reinforcing composite layer 22 is retained in the mold 56. In such a configuration, the reinforcing composite layer 22 maintains such a bend or deformation after the first polymeric material 26 is integrated with the reinforcing composite layer 22.

Referring to FIG. 8, the reinforcing composite layer 22 is typically preformed with the use of the preforming mold 56. The preforming mold 56 includes a female preforming mold 56 half having a preforming cavity 58 corresponding to the predetermined shape and a male preforming mold 56 half corresponding to the preforming cavity 58. In the configuration where the reinforcing composite layer 22 is preformed by thermoforming, the reinforcing composite layer 22 is heated and placed in the preforming cavity 58 whereby the male preforming mold 56 half exerts force on the reinforcing composite layer 22 to permanently deform the reinforcing composite layer 22 in the preforming cavity 58. In the configuration where the reinforcing composite layer 22 is preformed by compression molding, the reinforcing composite layer 22 is placed in the preforming cavity 58 and the male preforming mold 56 half exerts force on the reinforcing composite layer 22 to permanently deform the reinforcing composite layer 22 in the preforming cavity 58.

The method further includes the step of combining the sheets 32 into the single stack. The step of combining the plurality of sheets 32 includes positioning at least one of the plurality of sheets 32 with the fibers 30 being continuous and extending in the first direction D and positioning at least another of the plurality of sheets 32 with the fibers 30 being continuous and extending angularly relative the first direction D.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A method of forming a frame of a seat back for a vehicle, the frame including a first polymeric material and a reinforcing composite layer that includes a second polymeric material and a plurality of fibers impregnated in the second polymeric material, said method comprising the steps of:
    supporting the reinforcing composite layer on moveable members in a mold;
    extending the moveable members relative to the mold to an extended position in the mold;
    introducing the first polymeric material in a molten state into the mold and into contact with the reinforcing composite layer;
    displacing the reinforcing composite layer away from the moveable members by introducing the first polymeric material in the molten state between the moveable members and the reinforcing composite layer while the moveable members are in the extended position;
    causing the first polymeric material to solidify in the mold; and
    retracting the moveable members from the first polymeric material,
    wherein the reinforcing composite layer includes a first leg, a second leg spaced from the first leg, and a base extending between the first leg and the second leg,
    said step of supporting the reinforcing composite layer includes supporting the first leg of the reinforcing composite layer with a first group of the moveable members and supporting the second leg with a second group of the moveable members, and
    the mold includes a cavity, a core, and at least one slider configured to open relative to the cavity and/or the core and wherein at least one of the cavity and the core supports the first group of moveable members and the slider supports the second group of moveable members.

2. A method as set forth in claim 1 including the step of suspending the reinforcing composite layer from the mold on the moveable members in the extended position prior to introduction of the first polymeric material into the mold.

3. A method as set forth in claim 1 including the step of interposing the reinforcing composite layer between the first polymeric material in the molten state so that the first polymeric material contacts two sides of the reinforcing composite layer.

4. A method as set forth in claim 3 wherein one of the sides contacts the moveable members prior to introduction of the first polymeric material into the mold.

5. A method as set forth in claim 4 wherein said step of displacing the reinforcing composite layer includes abutting the reinforcing composite layer against the mold by flowing the first polymeric material in the molten state against the one of the opposing sides.

6. A method as set forth in claim 1 including the step of further comprising melting a portion of the second polymeric material of the reinforcing composite layer in contact with the first polymeric material in the molten state to bond the reinforcing composite layer to the first polymeric material upon solidification of the first polymeric material.

7. A method as set forth in claim 1 wherein said step of displacing the reinforcing composite layer includes abutting the reinforcing composite layer against the mold by flowing the first polymeric material in the molten state against the reinforcing composite layer between the moveable members and the reinforcing composite layer to move the reinforcing composite layer toward the mold.

8. A method as set forth in claim 1 including the steps of placing the reinforcing composite layer on the slider of the mold and moving the slider of the mold and a core and a cavity of the mold to a closed position to encase the reinforcing composite layer in the mold.

9. A method as set forth in claim 8 wherein at least some of the moveable members are supported by the slider and wherein extending the moveable members includes extending the slider supported moveable members relative to the slider and wherein retracting the moveable members includes retracting the slider supported moveable members relative to the slider.

10. A method as set forth in claim 9 wherein some of the moveable members are supported by at least one of the cavity and the core of the mold and wherein extending the moveable members includes extending the cavity/core supported moveable members relative to the at least one of the cavity and the core and wherein retracting the cavity/core moveable members includes retracting the moveable members relative to the at least one of the cavity and the core.

11. A method as set forth in claim 1 including the steps of supporting a second reinforcing composite layer on some of the moveable members in the mold spaced from the reinforcing composite layer, introducing the first polymeric material into contact with the second reinforcing composite layer while the some of the moveable members support the second reinforcing composite layer, and separating the second reinforcing composite layer from the moveable members by flowing the first polymeric material in the molten state between the moveable members and the second reinforcing composite layer.

12. A method as set forth in claim 11 including the steps of shaping the first polymeric material in the molten state into a back of the back extending from the reinforcing composite layer to the second reinforcing composite layer.

13. A method of forming a frame of a seat back for a vehicle, the frame including a first polymeric material and a reinforcing composite layer that includes a second polymeric material and a plurality of fibers impregnated in the second polymeric material, said method comprising the steps of:

supporting the reinforcing composite layer on moveable members in a mold;

extending the moveable members relative to the mold to an extended position in the mold;

suspending the reinforcing composite layer from the mold on the moveable members in the extended position;

introducing the first polymeric material in a molten state into the mold and into contact with the reinforcing composite layer;

displacing the reinforcing composite layer away from the moveable members by introducing the first polymeric material in the molten state between the moveable members and the reinforcing composite layer while the moveable members are in the extended position;

interposing the reinforcing composite layer between the first polymeric material in the molten state so that the first polymeric material contacts two sides of the reinforcing composite layer;

causing the first polymeric material to solidify in the mold; and retracting the moveable members from the first polymeric material, wherein the reinforcing composite layer includes a first leg, a second leg spaced from the first leg, and a base extending between the first leg and the second leg, said step of supporting the reinforcing composite layer includes supporting the first leg of the reinforcing composite layer with a first group of the moveable members and supporting the second leg with a second group of the moveable members, and the mold includes a cavity, a core, and at least one slider configured to open relative to the cavity and/or the core and wherein at least one of the cavity and the core supports the first group of moveable members and the slider supports the second group of moveable members.

14. A method as set forth in claim 13 wherein one of the sides contacts the moveable members prior to introduction of the first polymeric material into the mold.

15. A method as set forth in claim 13 wherein said step of displacing the reinforcing composite layer includes abutting the reinforcing composite layer against the mold by flowing the first polymeric material in the molten state against the one of the opposing sides.

16. A method as set forth in claim 13 including the steps of supporting a second reinforcing composite layer on some of the moveable members in the mold spaced from the reinforcing composite layer, introducing the first polymeric material into contact with the second reinforcing composite layer while the some of the moveable members support the second reinforcing composite layer, and separating the second reinforcing composite layer from the moveable members by flowing the first polymeric material in the molten state between the moveable members and the second reinforcing composite layer.

17. A method of forming a frame of a seat back for a vehicle, the frame including a first polymeric material and a reinforcing composite layer that includes a second polymeric material and a plurality of fibers impregnated in the second polymeric material, said method comprising the steps of:

supporting the reinforcing composite layer on moveable members in a mold;

extending the moveable members relative to the mold to an extended position in the mold;

suspending the reinforcing composite layer from the mold on the moveable members in the extended position;

introducing the first polymeric material in a molten state into the mold and into contact with the reinforcing composite layer;

displacing the reinforcing composite layer away from the moveable members by introducing the first polymeric material in the molten state between the moveable members and the reinforcing composite layer while the moveable members are in the extended position and abutting the reinforcing composite layer against the mold by flowing the first polymeric material in the molten state against the one of the opposing sides;

interposing the reinforcing composite layer between the first polymeric material in the molten state so that the first polymeric material contacts two sides of the reinforcing composite layer;

supporting a second reinforcing composite layer on some of the moveable members in the mold spaced from the reinforcing composite layer, introducing the first polymeric material into contact with the second reinforcing composite layer while the some of the moveable members support the second reinforcing composite layer, and separating the second reinforcing composite layer from the moveable members by flowing the first polymeric material in the molten state between the moveable members and the second reinforcing composite layer;

causing the first polymeric material to solidify in the mold; and retracting the moveable members from the first polymeric material, wherein the reinforcing composite layer includes a first leg, a second leg spaced from the first leg, and a base extending between the first leg and the second leg, said step of supporting the reinforcing composite layer includes supporting the first leg of the reinforcing composite layer with a first group of the moveable members and supporting the second leg with a second group of the moveable members, and the mold includes a cavity, a core, and at least one slider configured to open relative to the cavity and/or the core and wherein at least one of the cavity and the core supports the first group of moveable members and the slider supports the second group of moveable members.

* * * * *